(12) United States Patent
Ishihara (10) Patent No.: US 11,731,571 B2
(45) Date of Patent: Aug. 22, 2023

(54) WIRING JUNCTION BOX

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Akio Ishihara, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 343 days.

(21) Appl. No.: 17/274,875

(22) PCT Filed: Aug. 26, 2019

(86) PCT No.: PCT/JP2019/033318
§ 371 (c)(1),
(2) Date: Mar. 10, 2021

(87) PCT Pub. No.: WO2020/054380
PCT Pub. Date: Mar. 19, 2020

(65) Prior Publication Data
US 2022/0144192 A1 May 12, 2022

(30) Foreign Application Priority Data
Sep. 10, 2018 (JP) ................................. 2018-169086

(51) Int. Cl.
*B60R 16/02* (2006.01)
*B60R 16/023* (2006.01)
*H02G 3/16* (2006.01)

(52) U.S. Cl.
CPC ...... *B60R 16/0238* (2013.01); *B60R 16/0231* (2013.01); *H02G 3/16* (2013.01)

(58) Field of Classification Search
CPC . H02G 3/08; H02G 3/081; H02G 3/16; B60R 16/0238; B60R 16/0231;
(Continued)

(56) References Cited

U.S. PATENT DOCUMENTS 10,916,962 B2 * 2/2021 Hida .................... H02J 7/14
2018/0290608 A1 10/2018 Hida

FOREIGN PATENT DOCUMENTS

| JP | 2011-066239 A | 3/2011 |
| JP | 2011-108955 A | 6/2011 |
| JP | 2014-094660 A | 5/2014 |

OTHER PUBLICATIONS

International Search Report, Application No. PCT/JP2019/033318, dated Nov. 12, 2019. ISA/Japan Patent Office.

* cited by examiner

*Primary Examiner* — Angel R Estrada
(74) *Attorney, Agent, or Firm* — Honigman LLP (57) ABSTRACT

Provided is a wiring junction box for branching a wire connected to a plurality of ECUs mounted in a vehicle, including: a power input terminal connected to an electrical storage device supplying electric power to the ECUs; a plurality of power output terminals respectively outputting electric power input from the power input terminal to the plurality of ECUs; a communication device-side communication port connected to a communication device communicating with the ECUs; and a plurality of ECU-side communication ports respectively connected to the plurality of ECUs, wherein the wire includes a power line for connecting the power input terminal and the power output terminals and a communication line for connecting the communication (Continued)

device-side communication port and the ECU-side communication ports, the power line branches according to the number of power output terminals, and the communication line branches according to the number of ECU-side communication ports.

12 Claims, 4 Drawing Sheets

(58) Field of Classification Search
CPC ..... B60R 16/02; B60R 16/03; B60R 16/0239; H05K 5/00; H05K 5/02; H05K 5/0247
USPC ............. 174/50, 59, 17 R, 520; 220/3.2, 3.3, 220/4.02; 361/600, 601, 602, 605, 641
See application file for complete search history.

WIRING JUNCTION BOX

CROSS-REFERENCE TO RELATED APPLICATIONS

This application is the U.S. national stage of PCT/JP2019/033318 filed on Aug. 26, 2019, which claims priority of Japanese Patent Application No. JP 2018-169086 filed on Sep. 10, 2018, the contents of which are incorporated herein.

TECHNICAL FIELD

The present disclosure relates to a wiring junction box.

BACKGROUND ART

There are known vehicle electrical junction boxes for branching a power line from a vehicle power source, the vehicle power source being a device such as an electrical storage device and being mounted in a vehicle, wherein electric power is divided and supplied via the branched parts of the power line to vehicle-mounted devices (loads) such as ECUs (electronic control units) (see JP 2014-94660A, for example).

The vehicle electrical junction box according to JP 2014-94660A includes a power source terminal configured to be connected to a vehicle power source, a relay connected to the power source terminal, and an electric wire that is located on the path after the relay and branches into four systems. Loads are respectively connected to the branched parts of the electric wire branched into four systems, and electric power from the vehicle power source is divided and supplied to the four loads.

In order to allow ECUs to function, it is necessary to supply electric power to the ECUs, and to connect communication lines to the ECUs, the communication lines being for use in communication between the ECUs. However, the wiring junction box of JP 2014-94660A merely branches power lines, that is, there is a problem in that it is not possible to perform routing such as the branching of communication lines connected to ECUs.

The present disclosure was made in view of these circumstances, and it is an object thereof to provide a wiring junction box capable of supporting routing such as the branching of power lines and communication lines.

SUMMARY

An aspect of this disclosure is directed to a wiring junction box for branching a wire that is connected to a plurality of ECUs mounted in a vehicle, including: a power input terminal configured to be connected to an electrical storage device that supplies electric power to the ECUs; a plurality of power output terminals configured to respectively output electric power input from the power input terminal, to the plurality of ECUs; a communication device-side communication port configured to be connected to a communication device that communicates with the ECUs; and a plurality of ECU-side communication ports configured to be respectively connected to the plurality of ECUs, wherein the wire includes a power line for connecting the power input terminal and the power output terminals and a communication line for connecting the communication device-side communication port and the ECU-side communication ports, the power line branches according to the number of power output terminals, and the communication line branches according to the number of ECU-side communication ports.

Advantageous Effects of the Present Disclosure

According to an aspect of this disclosure, it is possible to provide a wiring junction box capable of supporting routing such as the branching of power lines and communication lines.

DETAILED DESCRIPTION OF PREFERRED EMBODIMENTS

First, embodiments of the present disclosure will be listed and described. It is also possible that at least some of the following embodiments are combined as appropriate.

A first aspect of this disclosure is directed to a wiring junction box for branching a wire that is connected to a plurality of ECUs mounted in a vehicle, including: a power input terminal configured to be connected to an electrical storage device that supplies electric power to the ECUs; a plurality of power output terminals configured to respectively output electric power input from the power input terminal, to the plurality of ECUs; a communication device-side communication port configured to be connected to a communication device that communicates with the ECUs; and a plurality of ECU-side communication ports configured to be respectively connected to the plurality of ECUs, wherein the wire includes a power line for connecting the power input terminal and the power output terminals and a communication line for connecting the communication device-side communication port and the ECU-side communication ports, the power line branches according to the number of power output terminals, and the communication line branches according to the number of ECU-side communication ports.

According to the first aspect, the wiring junction box performs routing and branching of a power line and a communication line that are to be connected to a plurality of ECUs, and thus it is possible to simplify the correspondence in routing of the power line and the communication line with respect to the plurality of ECUs, and to improve the routing in the vehicle.

A second aspect of this disclosure is directed to the wiring junction box, wherein the plurality of ECUs include a plurality of self-driving system ECUs, the plurality of self-driving system ECUs include main ECUs and sub ECUs, and the power line and the communication line each have systems respectively corresponding to the main ECUs and the sub ECUs.

According to the second aspect, in order to implement a self-driving function in a vehicle, it is necessary to additionally mount a plurality of self-driving system ECUs required for the self-driving function. From the viewpoint of improving availability or ensuring reliability, it is desirable to achieve redundancy of the self-driving system ECUs. Meanwhile, the wiring junction box includes a power line and a communication line each having systems respectively corresponding to main ECUs and sub ECUs, thereby achieving redundancy of the main ECUs and the sub ECUs. It is possible to simplify the routing of the power line and the communication line corresponding to each of the main ECUs and the sub ECUs that have been made redundant, and to make a contribution to ensuring the reliability of the self-driving function and the like. Note that the implementing a self-driving function in a vehicle encompasses additionally implementing a self-driving function in a vehicle initially configured as a manual driving vehicle.

A third aspect of this disclosure is directed to the wiring junction box, wherein the power line includes a main power line of systems corresponding to the main ECUs and a sub power line of systems corresponding to the sub ECUs, the communication line includes a main communication line of systems corresponding to the main ECUs and a sub communication line of systems corresponding to the sub ECUs, the main power line branches according to the number of power output terminals for the main ECUs, the main communication line branches according to the number of ECU-side communication ports for the main ECUs, the sub power line branches according to the number of power output terminals for the sub ECUs, and the sub communication line branches according to the number of ECU-side communication ports for the sub ECUs.

According to the third aspect, the main power line and the main communication line branch respectively according to the number of power output terminals and ECU-side communication ports for the main ECUs connected thereto, and the sub power line and the sub communication line branch respectively according to the number of power output terminals and ECU-side communication ports for the sub ECUs connected thereto, and thus it is possible to optimize the number of branches in each system.

A fourth aspect of this disclosure is directed to the wiring junction box further including: a sub power input terminal configured to be connected to a sub electrical storage device, wherein the power line includes a connection line for connecting the power input terminal and the sub power input terminal, and supply of electric power to the main ECUs and the sub ECUs is made redundant with the connection line.

According to the fourth aspect, the connection line connects the power input terminal and the sub power input terminal, and thus electric power input from each of the electrical storage device and the sub electrical storage device via the power input terminal and the sub power input terminal can be supplied to both of the main ECUs and the sub ECUs. Accordingly, even when a failure occurs in either one of the electrical storage device and the sub electrical storage device, it is possible to continue supplying electric power from the other, thereby achieving redundancy.

A fifth aspect of this disclosure is directed to the wiring junction box, wherein the connection line includes a separating unit configured to separate the power input terminal and the sub power input terminal, and the separating unit separates the power input terminal and the sub power input terminal when there is an abnormality in the connection line.

According to the fisth aspect, when there is an abnormality such as a ground fault in the main power line or the sub power line, electric power output from the electrical storage device and the sub electrical storage device is not supplied to the main ECUs and the sub ECUs, and the separating unit separates the power input terminal and the sub power input terminal that are connected to each other through the connection line. If the power input terminal and the sub power input terminal are separated, electric power input from the power input terminal or the sub power input terminal on the power line side on which no ground fault has occurred can be continuously supplied to the main ECUs or the sub ECUs.

A sixth aspect of this disclosure is directed to the wiring junction box further including: a main communication junction unit configured to be connected to the main communication line and branch the main communication line; and a sub communication junction unit configured to be connected to the sub communication line and branch the sub communication line, wherein the main communication junction unit and the sub communication junction unit function as a layer 2 switch or a layer 3 switch.

According to the sixth aspect, the main communication junction unit and the sub communication junction unit are used as a layer 2 switch or a layer 3 switch, and thus it is possible to efficiently perform relay processing of communication according to each layer in the main communication junction unit and the sub communication junction unit.

A seventh aspect of this disclosure is directed to the wiring junction box, wherein the communication device-side communication port includes a main communication port and a sub communication port, the main communication line is connected to the main communication port, and the sub communication line is connected to the sub communication port.

According to the seventh aspect, the communication device-side communication port includes a main communication port and a sub communication port, and the main communication port and the sub communication port are connected to the communication device. Accordingly, it is possible to achieve redundancy by duplicating communication between the wiring junction box and the communication device.

An eighth aspect of this disclosure is directed to the wiring junction box, wherein the plurality of ECUs include operation system main ECUs and operation system sub ECUs, and the operation system sub ECUs are connected to the power line and the communication line of the same systems as the sub ECUs.

According to the eighth aspect, the operation system sub ECUs are connected to the power line and the communication line of the same systems as the sub ECUs. Accordingly, for example, in order to additionally implement a self-driving function, even when redundancy of the operation system ECUs is achieved by additionally mounting the operation system sub ECUs, it is possible to simplify the correspondence of the power line and the communication line with respect to the operation system sub ECUs, and to improve the routing in the vehicle.

A ninth aspect of this disclosure is directed to the wiring junction box arranged between the electrical storage device and the sub electrical storage device, and positioned at a center portion of the vehicle.

According to the ninth aspect, the wiring junction box is arranged between the electrical storage device and the sub electrical storage device, and is positioned at a center portion of the vehicle, and thus it is possible to simplify the routing of the power source wire between the wiring junction box, and the electrical storage device and the sub electrical storage device, and to improve the resistance to a physical shock from the outside of the vehicle.

Hereinafter, the present disclosure will be specifically described based on the drawings showing embodiments thereof. A wiring junction box 1 according to an embodiment of this disclosure will be described hereinafter with reference to the drawings. It should be noted that the present disclosure is not limited to these examples, and is intended to include all modifications which fall within the scope of the claims and the meaning and scope of equivalents thereof.

Embodiment 1

Figure 1:
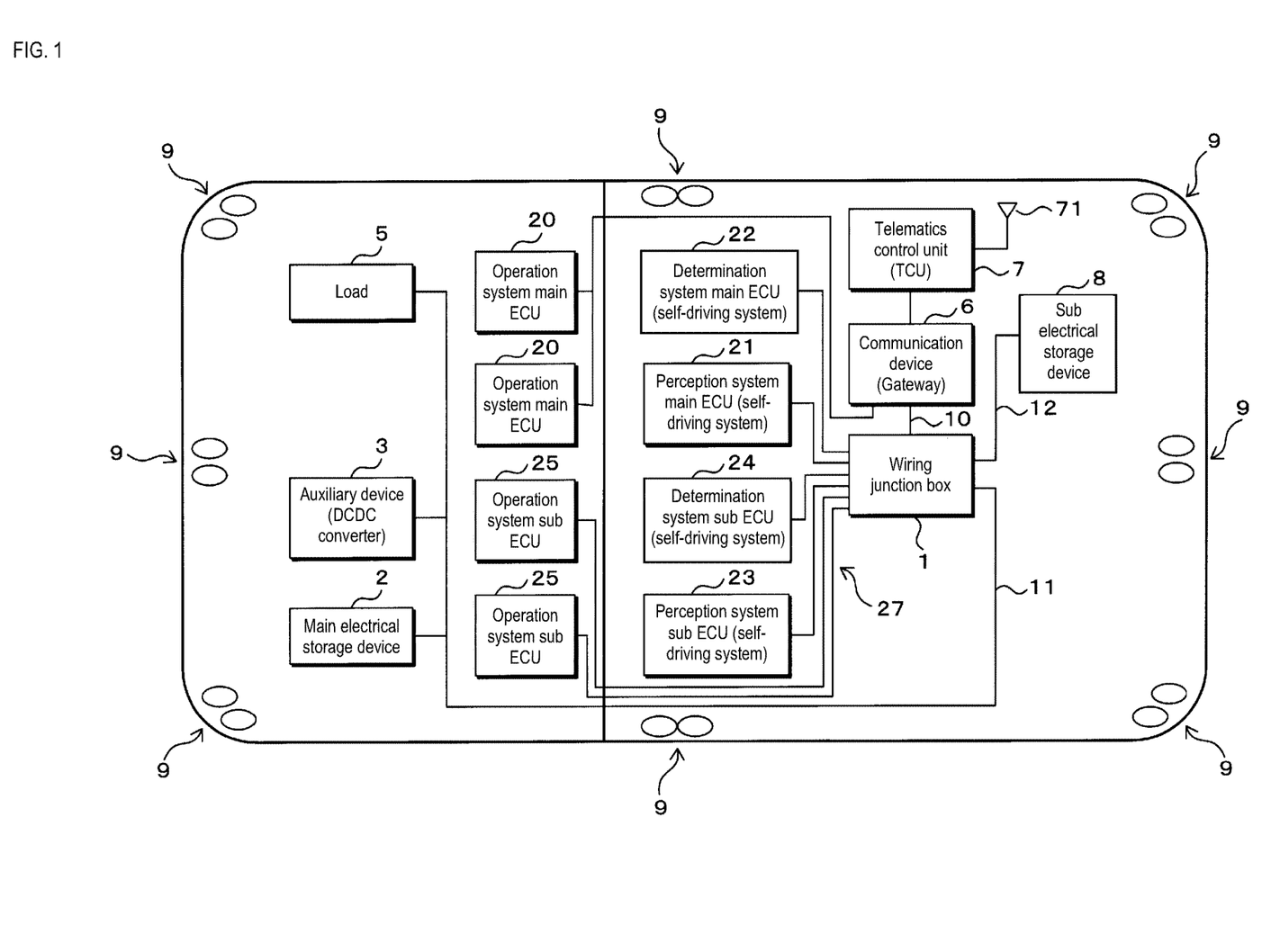
FIG. 1 is a schematic diagram showing a state in which a wiring junction box according to Embodiment 1 is arranged in a vehicle.
Figure 2:
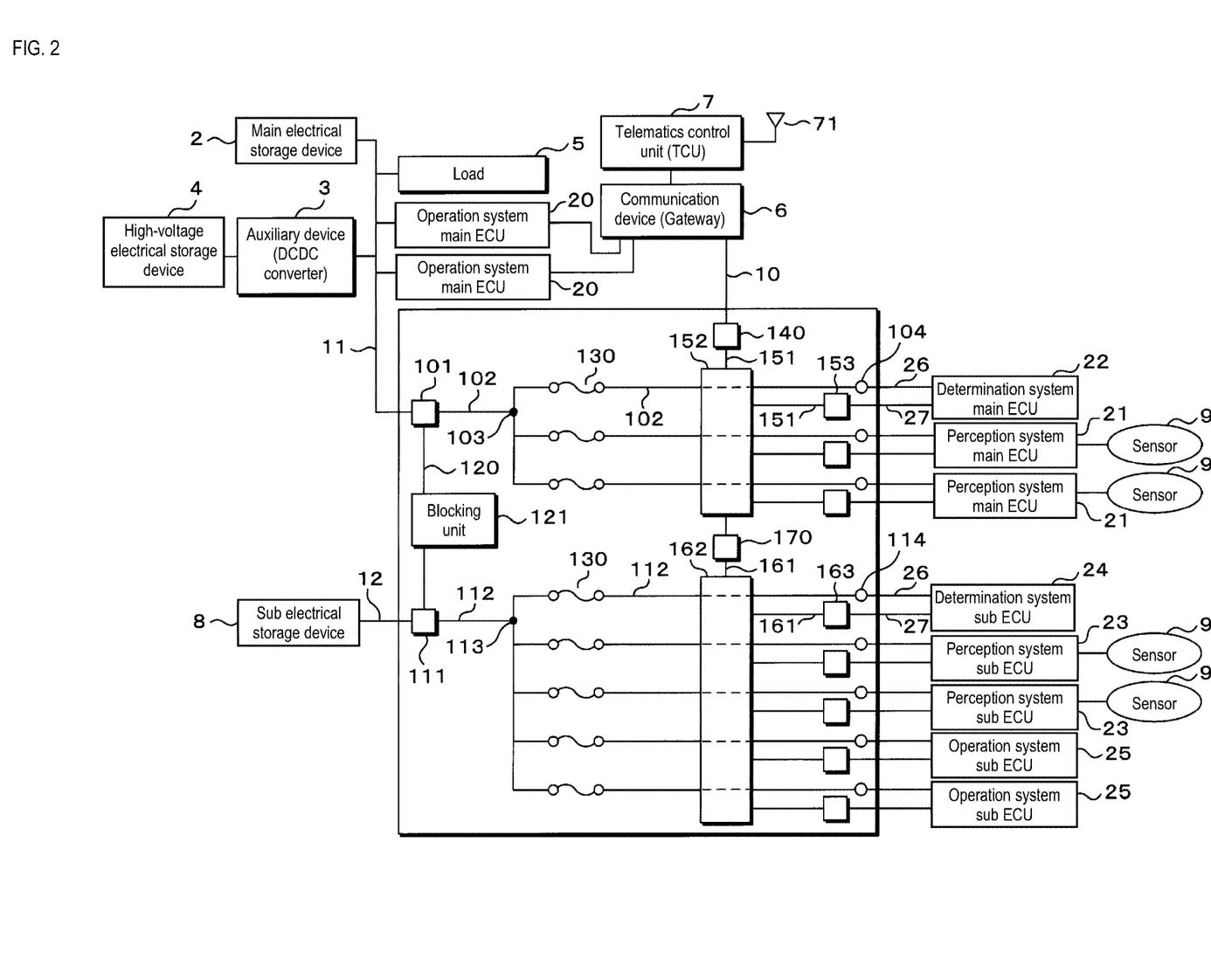
FIG. 2 is a block diagram showing the configuration of the wiring junction box.

FIG. 1 is a schematic diagram showing a state in which the wiring junction box 1 according to Embodiment 1 is arranged in a vehicle. FIG. 2 is a block diagram showing the configuration of the wiring junction box 1. The internal portion of the vehicle includes the wiring junction box 1, a main electrical storage device 2, an auxiliary device 3, a load 5, a high-voltage electrical storage device 4, a communication device 6, a telematics control unit 7, and a sub electrical storage device 8.

The main electrical storage device 2 is, for example, a 12-V DC power source such as a lead battery. The main electrical storage device 2 is connected to the wiring junction box 1 through a main power source wire 11. The auxiliary device 3 is, for example, a DCDC converter, and is a device that changes a high DC voltage applied from the high-voltage electrical storage device 4 such as a lithium ion battery into 12 V, and outputs the voltage. The auxiliary device 3 and the main electrical storage device 2 are connected in parallel through the main power source wire 11, and the auxiliary device 3 is connected to the wiring junction box 1 through the main power source wire 11, as with the main electrical storage device 2. The load 5 such as a drive motor is connected to the main electrical storage device 2 and the auxiliary device 3 through a power source wire branching from the main power source wire 11, and the load 5 is driven by electric power supplied from the main electrical storage device 2 or the auxiliary device 3.

The sub electrical storage device 8 is, for example, a 12-V DC power source such as a lead battery. The sub electrical storage device 8 is connected to the wiring junction box 1 through a sub power source wire 12.

The communication device 6 is communicably connected to a later-described plurality of operation system main ECUs 20 (Electronic Control Units), for example, through a CAN (Controller Area Network/registered trademark) or Ethernet (registered trademark) cable or the like, and relays communication between various ECUs including the plurality of operation system main ECUs 20 connected thereto. For example, the communication device may be a relay device called a gateway.

The wiring junction box 1 is communicably connected to the communication device 6, for example, through a communication wire 10 such as an Ethernet (registered trademark) cable. Furthermore, the communication device 6 is communicably connected to the telematics control unit 7, for example, through a harness such as a serial cable.

The telematics control unit 7 is connected to an antenna 71 for performing wireless communication with an external server (not shown) outside the vehicle, through a harness or the like. For example, the telematics control unit 7 performs wireless communication with the external server outside the vehicle using a predetermined wide area communication standard such as 5G, 4G, or LTE, and is, for example, a communication device called a TCU (Telematics Communication Unit).

ECUs for controlling various vehicle-mounted devices (not shown) are provided inside the vehicle. The ECUs include operation system ECUs (operation system main ECUs 20 and operation system sub ECUs 25) for controlling traveling, stopping, steering, and the like of the vehicle, and self-driving system EUC (a determination system main ECU 22, a perception system main ECU 21, a determination system sub ECU 24, and a perception system sub ECU 23) for controlling self-driving functions of the vehicle. The perception system main ECU 21 and the perception system sub ECU 23 perceive an object such as an obstacle that is located outside the vehicle, based on data acquired or detected by various sensors 9 connected thereto. The determination system main ECU 22 and the determination system sub ECU 24 perform determination regarding driving of the vehicle, based on the object perceiving result. The operation system main ECUs 20 and the operation system sub ECUs 25 control operations of an actuator regarding traveling, stopping, steering, and the like of the vehicle, based on the determination result.

The self-driving system EUC (the determination system main ECU 22, the perception system main ECU 21, the determination system sub ECU 24, and the perception system sub ECU 23) and the operation system sub ECUs 25 are communicably connected to the wiring junction box 1, for example, through communication cables 27 such as Ethernet cables. Although the details thereof will be described later, the wiring junction box 1 functions as a relay unit that relays communication between the self-driving system EUC (the determination system main ECU 22, the perception system main ECU 21, the determination system sub ECU 24, and the perception system sub ECU 23), the operation system sub ECUs 25, and the communication device 6 connected thereto. The communication device 6 is connected to the telematics control unit 7, and the self-driving system EUC (the determination system main ECU 22, the perception system main ECU 21, the determination system sub ECU 24, and the perception system sub ECU 23) and the operation system sub ECUs 25 communicate with an external server (not shown) that is located outside the vehicle, via the wiring junction box 1, the communication device 6, and the telematics control unit 7.

Electric power supplied through the main power source wire 11 or the sub power source wire 12 is divided by the wiring junction box 1 to the self-driving system EUC (the determination system main ECU 22, the perception system main ECU 21, the determination system sub ECU 24, and the perception system sub ECU 23) and the operation system sub ECUs 25. Although FIG. 1 shows a state in which the wiring junction box 1 is connected to the self-driving system EUC (the determination system main ECU 22, the perception system main ECU 21, the determination system sub ECU 24, and the perception system sub ECU 23) and the operation system sub ECUs 25, through the communication cables 27, they are connected to each other also through power source cables 26 as shown in FIG. 2.

The sensors 9 are communicably connected to the perception system main ECU 21 or the perception system sub ECU 23 through a harness such as a serial cable (not shown). The sensors 9 include an image capturing unit such as a COMS camera for capturing an image of the scenery outside the vehicle, and an infrared sensor, a millimeter-wave radar, or a LiDAR (Light Detection and Ranging) instrument for detecting an object that is located outside the vehicle. The sensors are arranged around the entire periphery including the front, the sides, and the rear of the vehicle. The number of sensors 9 arranged at each position is two, and the two sensors 9 have similar functions. One of the two sensors 9 is connected to the perception system main ECU 21, and the other sensor 9 is connected to the perception system sub ECU 23.

Although it was stated that the two sensors 9 have similar functions, the sensors 9 do not necessarily have to have exactly the same functions or the exactly the same specifications as each other. For example, it is also possible that one of the two sensors 9 is a COMS camera, and the other sensor 9 is a LiDAR instrument. It is also possible that the two sensors 9 acquire or detect different types of data, and the perception system main ECU 21 and the perception system sub ECU 23 respectively connected to the sensors 9 perceive an object such as an obstacle that is located outside the vehicle, based on the acquired or detected data.

The operation system main ECUs 20 are connected to the main electrical storage device 2 and the auxiliary device 3 through power source wires branching from the main power source wire 11, as with the load 5, and are driven by electric power supplied from the main electrical storage device 2 or the auxiliary device 3. The operation system main ECUs 20 are communicably connected to the communication device 6, for example, through an Ethernet cable or the like. The plurality of operation system main ECUs 20 connected to the communication device 6 communicate with other ECUs via the communication device 6, and communicate with an external server outside the vehicle via the communication device 6 and the telematics control unit 7.

The thus configured vehicle is obtained by additionally implementing a self-driving function in a manual driving vehicle. That is to say, the vehicle was initially configured as a manual driving vehicle, and the operation system main ECUs 20 for controlling traveling, stopping, steering, and the like of the manual driving vehicle are mounted therein. In order to additionally implement a self-driving function in a manual driving vehicle, the self-driving system EUC (the determination system main ECU 22, the perception system main ECU 21, the determination system sub ECU 24, and the perception system sub ECU 23) and various sensors 9 particularly connected to the perception system main ECU 21 or the perception system sub ECU 23 out of the self-driving system ECUs are additionally mounted.

When a vehicle performs traveling, stopping, steering, and the like by means of its self-driving function, the self-driving system ECUs are made redundant by duplicating the main ECUs (the perception system main ECU 21 and the determination system main ECU 22) and the sub ECUs (the perception system sub ECU 23 and the determination system sub ECU 24), and, furthermore, the sub electrical storage device 8 is additionally mounted as the power source. Furthermore, in order to achieve redundancy of the operation system main ECUs 20 initially mounted in a manual driving vehicle, the operation system sub ECUs 25 are additionally mounted. When the self-driving function is additionally implemented in the manual driving vehicle in this manner, the self-driving system ECUs and the operation system ECUs are duplicated, and the power supply sources (the main electrical storage device 2 and the sub electrical storage device 8) to the self-driving system ECUs and the operation system ECUs are duplicated to achieve redundancy, and thus the availability of the self-driving function can be improved.

The wiring junction box 1 includes a main power input terminal 101, a main power line 102, a plurality of main power output terminals 104, a sub power input terminal 111, a sub power line 112, a plurality of sub power output terminals 114, a connection line 120, and a blocking unit 121.

The main power input terminal 101 is a power source terminal or socket to which the main power source wire 11 is connected. The main power line 102 is connected to the main power input terminal 101. The main power line 102 is constituted by a cable or bus bar, for example. An electric current that flows from the main electrical storage device 2 or the auxiliary device 3 connected through the main power source wire 11 flows via the main power input terminal 101 to the main power line 102.

The main power output terminals 104 are power source terminals or sockets to which the power source cables 26 for supplying electric power to the main ECUs (the perception system main ECU 21 and the determination system main ECU 22) are connected.

The main power line 102 is constituted by a cable or bus bar, and branches at a main power branch point 103 according to the number of main power output terminals 104 corresponding thereto. Accordingly, the main power line 102 branches at the main power branch point 103, and the branched parts of the main power line 102 are respectively connected to the main power output terminals 104 corresponding thereto.

Fuses 130 are respectively arranged at portions between the main power branch point 103 and the plurality of main power output terminals 104. The rated values of the fuses 130 such as melting properties are set according to the diameter or allowable current value of the branched parts of the main power line 102.

The sub power input terminal 111 is a power source terminal or socket to which the sub power source wire 12 is connected. The sub power line 112 is connected to the sub power input terminal 111. The sub power line 112 is constituted by a cable or bus bar, for example. An electric current that flows from the sub electrical storage device 8 connected through the sub power source wire 12 flows via the sub power input terminal 111 to the sub power line 112.

The sub power output terminals 114 are power source terminals or sockets to which the power source cables 26 for supplying electric power to the sub ECUs (the perception system sub ECU 23, the determination system sub ECU 24, and the operation system sub ECUs 25) are connected.

The sub power line 112 is constituted by a cable or bus bar, and branches at a sub power branch point 113 according to the number of sub power output terminals 114 corresponding thereto. Accordingly, the sub power line 112 branches at the sub power branch point 113, and the branched parts of the sub power line 112 are respectively connected to the sub power output terminals 114 corresponding thereto.

Fuses 130 are respectively arranged at portions between the sub power branch point 113 and the plurality of sub power output terminals 114. The rated values of the fuses 130 such as melting properties are set according to the diameter or allowable current value of the branched parts of the sub power line 112.

The wiring junction box 1 includes two power systems composed of a main power system including the main power input terminal 101, the main power line 102, and the plurality of main power output terminals 104, and a sub power system including the sub power input terminal 111, the sub power line 112, and the plurality of sub power output terminals 114. Different power supply sources (the main electrical storage device 2 and the auxiliary device 3, or the sub electrical storage device 8) are respectively connected to the two power systems.

That is to say, the main electrical storage device 2 and the auxiliary device 3 are connected to the main power system. The sub electrical storage device 8 is connected to the sub power system. Accordingly, even when a failure occurs in either one of the power supply sources, it is possible to continue supplying electric power to ECUs of a power system connected to the other power supply source.

The main power input terminal 101 and the sub power input terminal 111 are electrically connected to each other through the connection line 120. The connection line 120 is constituted by a cable or bus bar, as with the main power line 102 and the sub power line 112. When the main power input terminal 101 and the sub power input terminal 111 are electrically connected to each other through the connection line 120, electric power supplied from the main electrical storage device 2 or the auxiliary device 3 through the main power source wire 11 and electric power supplied from the sub electrical storage device 8 through the sub power source wire 12 can be supplied to the main ECUs and the sub ECUs through the main power line 102 or the sub power line 112. Accordingly, even when electric power cannot be supplied from either one of the power supply sources composed of the main electrical storage device 2 and the auxiliary device 3, and the sub electrical storage device 8 due to a failure that has occurred therein, electric power can be supplied from the other power supply source to both of the main ECUs and the sub ECUs. For example, if a failure occurs in the main electrical storage device 2 and the auxiliary device 3, electric power supplied from the sub electrical storage device 8 can also be supplied to the main ECUs through the connection line 120 and the main power line 102 (the main power system).

The connection line 120 includes the blocking unit 121 configured to block connection between the main power input terminal 101 and the sub power input terminal 111. The details thereof will be described later.

The wiring junction box 1 further includes a communication device-side communication port 140, a plurality of main ECU-side communication ports 153, a plurality of sub ECU-side communication ports 163, a main communication junction unit 152, a sub communication junction unit 162, and a cascade unit 170 configured to connect the main communication junction unit 152 and the sub communication junction unit 162.

The communication device-side communication port 140 is, for example, a connector-type communication port that conforms to the Ethernet standard such as 100BASE-T1 or 1000BASE-T1, and functions as an input/output interface in the Ethernet communication. The wiring junction box 1 is connected to the communication device 6, for example, through the communication wire 10 constituted by an Ethernet cable, via the communication device-side communication port 140.

The main ECU-side communication ports 153 are, for example, connector-type communication ports that conform to the Ethernet standard such as 100BASE-T1 or 1000BASE-T1, and function as input/output interfaces in the Ethernet communication, as with the communication device-side communication port 140. The wiring junction box 1 is connected to the main ECUs (the perception system main ECU 21 and the determination system main ECU 22), for example, through the communication cables 27 constituted by Ethernet cables, via the main ECU-side communication ports 153.

The main communication junction unit 152 is connected to the communication device-side communication port 140 through a main communication line 151. The main communication junction unit 152 branches the main communication line 151 connected to the communication device-side communication port 140 according to the number of main ECU-side communication ports 153. That is to say, the parts of the main communication line 151 branched by the main communication junction unit 152 are respectively connected to the plurality of main ECU-side communication ports 153 corresponding thereto. In this manner, the main communication junction unit 152 constitutes a junction circuit for branching the communication wire 10 connected to the communication device-side communication port 140.

It is also possible that, for example, the main communication junction unit 152 is constituted by an Ethernet switch that is a layer 2 switch or a layer 3 switch. Alternatively, it is also possible that an Ethernet switch is constituted by the communication device-side communication port 140, the plurality of main ECU-side communication ports 153, the main communication junction unit 152, and the main communication line 151 for connecting the main ECU-side communication ports 153 and the main communication junction unit 152. In this case, the main communication junction unit 152 corresponds to a microcomputer for controlling an Ethernet switch, and the main communication line 151 corresponds to an internal bus arranged inside the Ethernet switch. If the main communication junction unit 152 is constituted by an Ethernet switch, it is possible to perform switching control using MAC addresses of the main ECUs in the case of a layer 2 switch or using IP addresses of the main ECUs in the case of a layer 3 switch. It is also possible that, for example, the main communication junction unit 152 detects an abnormality in the communication at a main ECU-side communication port 153, and blocks the main ECU-side communication port 153 at which the abnormality was detected. Even when the main ECU-side communication port 153 is blocked, a function required for traveling and the like of a vehicle can be realized by sub ECUs having functions similar to those of the main ECUs connected to the main ECU-side communication ports 153.

As with the main ECU-side communication ports 153, the sub ECU-side communication ports 163 are, for example, connector-type communication ports that conform to the Ethernet standard such as 100BASE-T1 or 1000BASE-T1, and function as input/output interfaces in the Ethernet communication. The wiring junction box 1 is connected to the sub ECUs (the perception system sub ECU 23, the determination system sub ECU 24, and the operation system sub ECUs 25), for example, through the communication cables 27 constituted by Ethernet cables, via the sub ECU-side communication ports 163.

The sub communication junction unit 162 and the main communication junction unit 152 are connected to each other via the cascade unit 170. The cascade unit 170 is constituted by a cascade port included in the sub communication junction unit 162, for example. If the cascade unit 170 and the main communication junction unit 152 are connected to each other through the main communication line 151, and the cascade unit 170 and the sub communication junction unit 162 are connected to each other through a sub communication line 161, the sub communication junction unit 162 and the main communication junction unit 152 are connected to each other. The sub communication junction unit 162 is connected to the communication device-side communication port 140 via the sub communication line 161, the cascade unit 170, and the main communication junction unit 152.

The sub communication junction unit 162 branches the sub communication line 161 according to the number of sub ECU-side communication ports 163. That is to say, the parts of the sub communication line 161 branched by the sub communication junction unit 162 are respectively connected to the plurality of sub ECU-side communication ports 163 corresponding thereto. In this manner, the sub communication junction unit 162 constitutes a junction circuit for branching the communication wire 10 connected to the communication device-side communication port 140.

It is also possible that, for example, the sub communication junction unit 162 is constituted by an Ethernet switch that is a layer 2 switch or a layer 3 switch. Alternatively, it is also possible that an Ethernet switch is constituted by the cascade unit 170, the plurality of sub ECU-side communication ports 163, the sub communication junction unit 162, and the sub communication line 161 for connecting the sub ECU-side communication ports 163 and the sub communication junction unit 162. In this case, the sub communication junction unit 162 corresponds to a microcomputer for controlling an Ethernet switch, and the sub communication line 161 corresponds to an internal bus arranged inside the Ethernet switch. If the sub communication junction unit 162 is constituted by an Ethernet switch, it is possible to perform switching control using MAC addresses of the sub ECUs in the case of a layer 2 switch or using IP addresses of the sub ECUs in the case of a layer 3 switch. It is also possible that, for example, the sub communication junction unit 162 detects an abnormality in the communication at a sub ECU-side communication port 163, and blocks the sub ECU-side communication port 163 at which the abnormality was detected. Even when the sub ECU-side communication port 163 is blocked, a function required for traveling and the like of a vehicle can be realized by main ECUs having functions similar to those of the sub ECUs connected to the sub ECU-side communication ports 163.

The wiring junction box 1 includes two communication systems composed of a main communication system including the main communication junction unit 152 and the plurality of main ECU-side communication ports 153, and a sub communication system including the sub communication junction unit 162 and the plurality of sub ECU-side communication ports 163. The main ECUs are connected to the main communication system, and the sub ECUs are connected to the sub communication system. When the main ECUs and the sub ECUs respectively corresponding to the main ECUs and having functions similar to those of the main ECUs are communicably connected to the wiring junction box 1, it is possible to achieve redundancy by duplicating the main ECUs of the main communication system and the sub ECUs of the sub communication system. Accordingly, even when there is a communication abnormality in either one of the main communication system and the sub communication system, it is possible to continue the self-driving function using the ECUs (the main ECUs or the sub ECUs) connected to the other communication system.

The main ECUs (the perception system main ECU 21 and the determination system main ECU 22) are connected to the main ECU-side communication ports 153 and the main power output terminals 104. That is to say, the main ECU-side communication ports 153 and the main ECUs are connected to each other through the communication cables 27, and the main ECUs communicate with other ECUs via the wiring junction box 1. The wiring junction box 1 relays communication between these ECUs. The main power output terminals 104 and the main ECUs are connected to each other through the power source cables 26, and electric power is supplied (divided) to the main ECUs via the wiring junction box 1.

The sub ECUs (the perception system sub ECU 23, the determination system sub ECU 24, and the operation system sub ECUs 25) are connected to the sub ECU-side communication ports 163 and the sub power output terminals 114. That is to say, the sub ECU-side communication ports 163 and the sub ECUs are connected to each other through the communication cables 27, and the sub ECUs communicate with other ECUs via the wiring junction box 1. The wiring junction box 1 relays communication between these ECUs. The sub power output terminals 114 and the sub ECUs are connected to each other through the power source cables 26, and electric power is supplied (divided) to the sub ECUs via the wiring junction box 1.

With the thus configured wiring junction box 1, especially when the self-driving function is additionally implemented in a manual driving vehicle, it is possible to aggregate branches and routings for achieving redundancy by duplicating ECUs that are additionally mounted, and to efficiently perform routing of the power source cables 26 and the communication cables 27 that are connected to the additionally mounted ECUs.

If the power line (the main power line 102 and the sub power line 112) and the communication line (the main communication line 151 and the sub communication line 161) are duplicated in the additionally mounted ECUs, that is, a main system and a sub system are provided for each of the electric power and the communication, it is possible to achieve redundancy in supplying the electric power and ensuring the communication, and to improve the resistance to obstacles or the availability of the self-driving function. Note that, for the sake of convenience, in the main system, reference numerals are attached to only one system shown on the upper side in the section of the diagram of FIG. 2 and FIG. 4, which will be described later, and the others are not shown. In a similar manner, in the sub system, reference numerals are attached to only one system shown on the upper side in the section of the diagram, and the others are not shown.

It is also possible that the main ECU-side communication ports 153 and the main power output terminals 104 respectively corresponding to the main ECUs are integrated as a composite connector. That is to say, the wiring junction box 1 may include a composite connector (a hybrid connector) in which a plurality of power terminals or communication terminals respectively included in the main ECU-side communication ports 153 and the main power output terminals 104 are combined to be present in a mixed manner in one connector. In a similar manner, it is also possible that the sub ECU-side communication ports 163 and the sub power output terminals 114 respectively corresponding to the sub ECUs are integrated as a composite connector (a hybrid connector). If the main ECU-side communication ports 153 and the main power output terminals 104, or the sub ECU-side communication ports 163 and the sub power output terminals 114 are configured as a composite connector (a composite main connector or a composite sub connector), it is possible to additionally mount main ECUs and sub ECUs with ease when additionally implementing a self-driving function, and to reduce the number of steps necessary to additionally implement a self-driving function.

Figure 3:
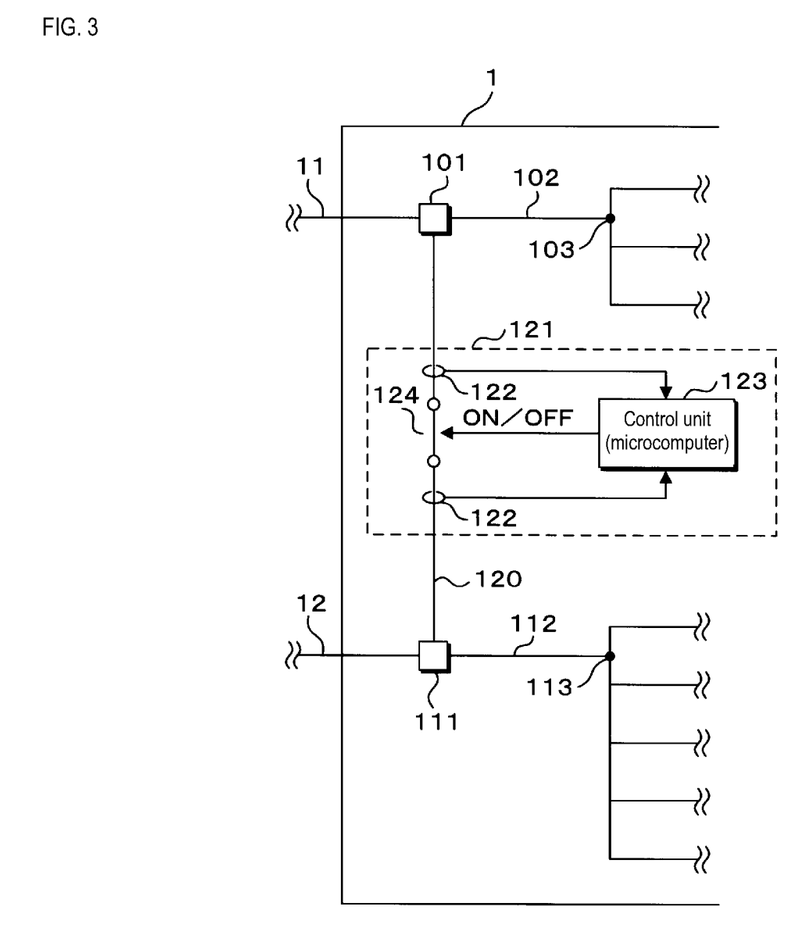
FIG. 3 is a block diagram showing the configuration of a blocking unit (separating unit).

FIG. 3 is a block diagram showing the configuration of the blocking unit 121 (separating unit). The blocking unit 121 includes a relay 124, abnormality detecting units 122, and a control unit 123.

The blocking unit 121 blocks the connection line 120, that is, blocks and separates the main power input terminal 101 and the sub power input terminal 111 connected to each other through the connection line 120, upon detecting an abnormality in the connection line 120, and corresponds to a separating unit.

The relay 124 is arranged on the connection line 120, and is, for example, a b-contact relay that is always on.

The abnormality detecting units 122 each include a current sensor that is a Hall element or the like for detecting a current value of an electric current that flows through the connection line 120, a voltage sensor that is a shunt resistance or the like for detecting a voltage to ground at the connection line 120, or a temperature sensor that is a thermistor or the like for detecting a temperature (Joule heat) of the connection line 120, and detect the electrical state quantity at the connection line 120. The sensors of the abnormality detecting units 122 are respectively arranged at the two ends of the relay 124 such that the abnormality detecting units 122 detect electrical state quantities at the two ends of the two ends of the relay 124. If the sensors are arranged in this manner, a potential difference between the two ends of the relay 124 can be detected. Furthermore, if the electrical state quantities at the two ends of the relay 124 are detected, both of the electrical state quantity on the main power input terminal 101 side and the electrical state quantity on the sub power input terminal 111 side can be acquired after the relay 124 is turned off. It is also possible that the abnormality detecting units 122 detect the electrical state quantity on either one side of the relay 124.

The control unit 123 is constituted by a microcomputer or the like including an MPU (microprocessor unit) and a memory. The control unit 123 determines whether or not there is an abnormality in the connection line 120 based on a detected value detected by the abnormality detecting units 122, and turns off the relay 124 upon determining that there is an abnormality (an abnormality has occurred).

A voltage output from the main electrical storage device 2 or the auxiliary device 3 is applied to the main power input terminal 101. A voltage output from the sub electrical storage device 8 is applied to the sub power input terminal 111. An electric current flows through the connection line 120 connecting the main power input terminal 101 and the sub power input terminal 111, in accordance with a potential difference between the main power input terminal 101 and the sub power input terminal 111. For example, when a ground fault has occurred in the main power line 102, the potential of the main power input terminal 101 is 0 V (the reference potential of ground), and thus a large current flows also from the sub power input terminal 111 through the connection line 120 to the main power line 102. Accordingly, if a large current that is a predetermined value or more flows through the connection line 120, if the temperature reaches a predetermined temperature due to Joule heat generated by the large current, or if the voltage of the connection line 120 is a predetermined value (e.g., substantially 0 V) or less, the control unit 123 determines, based on a detected value from the abnormality detecting units 122, that an abnormality has occurred in the main power line 102 or the sub power line 112, and turns off the relay 124. When the relay 124 is turned off, the main power input terminal 101 and the sub power input terminal 111 are blocked from each other. That is to say, the main power system and the sub power system are blocked from each other. When the main power input terminal 101 and the sub power input terminal 111 are blocked from each other, electric power is supplied to the ECUs (the main ECUs or the sub ECUs) connected to a properly operating power system.

Although a large current flows through the main power line 102 or the sub power line 112 in which an abnormality has occurred, since a fuse (not shown) is provided on the negative electrode side of the main electrical storage device 2 and the sub electrical storage device 8, this fuse melts and blocks the flow of a large current to the main power line 102 or the sub power line 112 in which the abnormality has occurred. Since the blocking unit 121 is provided in this manner, even when an abnormality has occurred in the main power line 102 or the sub power line 112, the main power input terminal 101 and the sub power input terminal 111 can be separated from each other before the fuse of the main electrical storage device 2 or the sub electrical storage device 8 connected to the side on which an abnormality has occurred melts. When the main power input terminal 101 and the sub power input terminal 111 are separated from each other, it is possible to continue supplying electric power to the ECUs (the main ECUs or the sub ECUs) connected to the power system on the side on which no abnormality has occurred. Although it was stated that the relay 124 is a mechanical relay that is a b-contact relay, there is no limitation to this. It is also possible that the relay 124 is a semiconductor relay such as an FET or an IGBT.

As shown in FIG. 1, the wiring junction box 1 is arranged between the main electrical storage device 2 and the sub electrical storage device 8, and is positioned at the center portion in the front-rear direction of the vehicle. The main electrical storage device 2 is arranged in the front portion of the vehicle, and the sub electrical storage device 8 that is additionally mounted in order to additionally implement a self-driving function is arranged in the rear portion of the vehicle. When the wiring junction box 1 is arranged between the main electrical storage device 2 and the sub electrical storage device 8, it is possible to efficiently perform routing of the power source wires (the main power source wire 11 and the sub power source wire 12) between the main electrical storage device 2 and the sub electrical storage device 8, and the wiring junction box 1. When the wiring junction box 1 is arranged between the main electrical storage device 2 arranged in the front portion of the vehicle and the sub electrical storage device 8 arranged in the rear portion thereof, the wiring junction box 1 is positioned at the center portion in the front-rear direction of the vehicle. Examples of the center portion of the vehicle in which the wiring junction box 1 is arranged include a portion inside a vehicle interior console, a portion inside an instrument panel, and a portion below a seat. When the wiring junction box 1 is arranged at the center portion in the front-rear direction of the vehicle, it is possible to reduce the influence on the wiring junction box 1 even when a shock is applied from the outside of the vehicle, and to improve the resistance to the shock.

The various sensors 9 such as perception system sensors, the self-driving system ECUs (the perception system main ECU 21, the determination system main ECU 22, the perception system sub ECU 23, and the determination system sub ECU 24), and the operation system sub ECUs 25 that are additionally mounted in order to additionally implement a self-driving function are arranged as appropriate inside the vehicle based on the applications, functions, and the like. Meanwhile, when the wiring junction box 1 is arranged at the center portion of the vehicle, it is possible to make a contribution to equalization of the distances from the various sensors 9 and the ECUs (the self-driving system ECUs and the operation system sub ECUs 25) that are additionally mounted. Accordingly, it is possible to efficiently perform routing such as shortening the cable lengths of the power source cables 26 and the communication cables 27 between the various sensors 9 and the ECUs that are additionally mounted, and the wiring junction box 1.

According to the wiring junction box 1, when the self-driving function is additionally implemented in a manual driving vehicle, the power source wires (the main power source wire 11 and the sub power source wire 12) and the communication wire 10 subjected to the routing for the self-driving system EUC (the determination system main ECU 22, the perception system main ECU 21, the determination system sub ECU 24, and the perception system sub ECU 23) and the operation system sub ECUs 25 that are additionally mounted are aggregated. When the power source wires (the main power source wire 11 and the sub power source wire 12) and the communication wire 10 are aggregated and branched at the wiring junction box 1, it is possible to simplify the routing of the power source wires (the main power source wire 11 and the sub power source wire 12) and the communication wire 10, and to reduce the number of steps necessary to additionally implement a self-driving function. Furthermore, when the wiring junction box 1 is used, it is possible to reduce the number of connection points in the wires (harnesses), reduce the number of units and the number of parts, lower the cost, and shorten the processing steps in the vehicle compared to the case when the power source wires and the communication wire 10 are separately aggregated and branched.

According to the wiring junction box 1, when the self-driving function is additionally implemented in a manual driving vehicle, a main system and a sub system are provided for each of the electric power and the communication so as to correspond to the main ECUs and the sub ECUs that are duplicated to achieve redundancy. With the main system and the sub system, the electric power and the communication are made redundant, and thus it is possible to reduce the number of steps necessary to additionally implement a self-driving function, and to make a contribution to improving the availability and ensuring the reliability of the self-driving function.

If the blocking unit 121 is provided, even when an abnormality such as a ground fault has occurred in any power system, it is possible to block connection between the main power input terminal 101 and the sub power input terminal 111, and to continue supplying electric power to the ECUs (the main ECUs or the sub ECUs) connected to the power system in which no abnormality has occurred.

In this embodiment, although it was stated that the vehicle is realized by additionally implementing a self-driving function in a manual driving vehicle, there is no limitation to this. The vehicle also encompasses vehicles produced as self-driving vehicles. The wiring junction box 1 is applicable to a vehicle having the self-driving function from the production processes in this manner. If the wiring junction box 1 is applied to a vehicle having the self-driving function from the production processes, the operation system main ECUs 20 may be connected to the main systems that are the same systems of electric power and communication as those of the main ECUs (the perception system main ECU 21 and the determination system main ECU 22). If the ECUs necessary to have the self-driving function, including the self-driving system EUC (the determination system main ECU 22, the perception system main ECU 21, the determination system sub ECU 24, and the perception system sub ECU 23) and the operation system ECUs (the operation system main ECUs 20 and the operation system sub ECUs 25) are connected to the wiring junction box 1, it is possible to efficiently perform the routing for electric power supply and communication required for the self-driving system EUC and the operation system ECUs.

Embodiment 2

Figure 4:
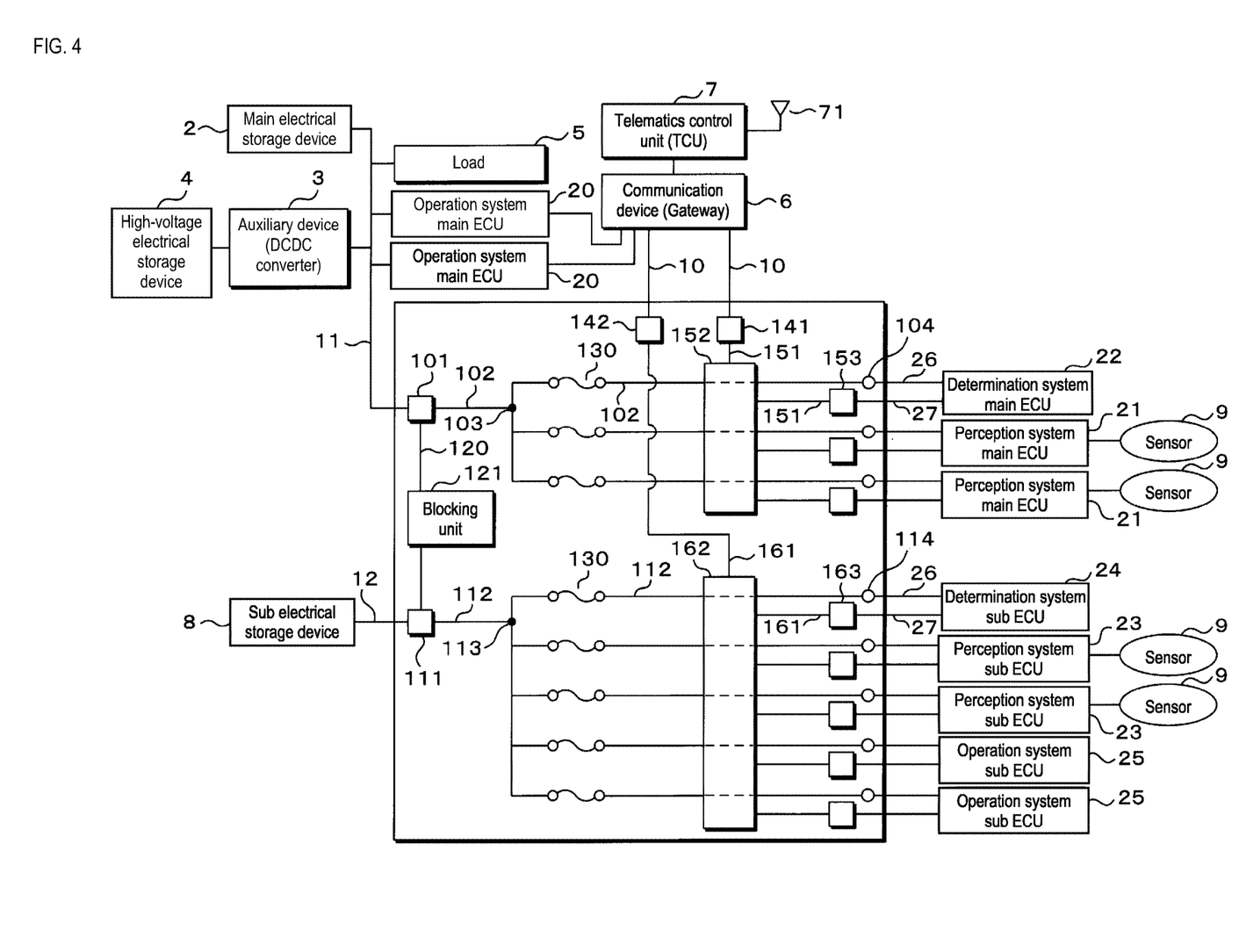
FIG. 4 is a block diagram showing the configuration of a wiring junction box according to Embodiment 2 (in which communication device-side communication ports are made redundant).

FIG. 4 is a block diagram showing the configuration of the wiring junction box 1 according to Embodiment 2 (in which communication device-side communication ports are made redundant). The wiring junction box 1 of Embodiment 2 is different from that of Embodiment 1 in that the communication device-side communication port 140 connected to the communication device 6 includes two communication ports composed of a main communication port 141 and a sub communication port 142.

The wiring junction box 1 includes the main communication port 141 and the sub communication port 142. The main communication port 141 and the sub communication port 142 are, for example, connector-type communication ports that conform to the Ethernet standard such as 100BASE-T1 or 1000BASE-T1, and function as input/output interfaces in the Ethernet communication, as with the communication device-side communication port 140 of Embodiment 1. The wiring junction box 1 is connected to the communication device 6 through the communication wires 10 constituted by Ethernet cables, via the main communication port 141 and the sub communication port 142.

The main communication junction unit 152 is connected to the main communication port 141 through the main communication line 151. The sub communication junction unit 162 is connected to the sub communication port 142 through the sub communication line 161. That is to say, the main communication junction unit 152 and the sub communication junction unit 162 are connected to the communication device 6 in parallel with each other.

The main communication junction unit 152 and the plurality of main ECU-side communication ports 153 are connected to each other in a similar way to that of Embodiment 1. The sub communication junction unit 162 and the plurality of sub ECU-side communication ports 163 are connected to each other in a similar way to that of Embodiment 1.

With this configuration, the cascade unit 170 for connecting the main communication junction unit 152 and the sub communication junction unit 162 is not necessary. Furthermore, the main communication system including the main communication junction unit 152 and the plurality of main ECU-side communication ports 153 and the sub communication system including the sub communication junction unit 162 and the plurality of sub ECU-side communication ports 163 can be separated from the connection level to the communication device 6 and be made completely different systems. Accordingly, it is possible to achieve redundancy through duplication also in the communication between the wiring junction box 1 and the communication device 6. That is to say, even when communication cannot be performed due to a failure that has occurred in the main communication junction unit 152, the sub ECUs can communicate with the communication device 6 via the sub communication junction unit 162, and communicate with an external server outside the vehicle via the communication device 6 and the telematics control unit 7. If redundancy is achieved through duplication also in the communication between the wiring junction box 1 and the communication device 6, even when an abnormality has occurred in the main communication system or the sub communication system, it is possible to reliably continue the self-driving function, by ensuring communication between the self-driving system ECUs (the main ECUs or the sub ECUs) connected to the communication system in which no abnormality has occurred, and an external server outside the vehicle.

Although it was stated that the cascade unit 170 for connecting the main communication junction unit 152 and the sub communication junction unit 162 is not necessary, there is no limitation to this. It is also possible that the main communication junction unit 152 and the sub communication junction unit 162 are connected to each other via the cascade unit 170 in a similar way to that of Embodiment 1. If the main communication junction unit 152 and the sub communication junction unit 162 are connected to each other via the cascade unit 170, it is possible to relay the communication between the main ECUs connected to the main communication junction unit 152 and the sub ECUs connected to the sub communication junction unit 162, in the wiring junction box 1, without using the communication device 6.

The embodiments disclosed herein are examples in all respects, and are not to be construed as limiting. The scope of the present disclosure is defined by the claims rather than by the meaning of the description above, and all modifications equivalent to and within the scope of the claims are intended to be encompassed.

The invention claimed is:

1. A wiring junction box for branching a wire that is connected to a plurality of ECUs mounted in a vehicle, comprising:
a power input terminal configured to be connected to an electrical storage device that supplies electric power to the ECUs;
a plurality of power output terminals configured to respectively output electric power input from the power input terminal, to the plurality of ECUs;
a communication device-side communication port configured to be connected to a communication device that communicates with the ECUs; and
a plurality of ECU-side communication ports configured to be respectively connected to the plurality of ECUs,
wherein the wire includes a power line for connecting the power input terminal and the power output terminals and a communication line for connecting the communication device-side communication port and the ECU-side communication ports,
the power line branches according to the number of power output terminals,
the communication line branches according to the number of ECU-side communication ports,
the plurality of ECUs include a plurality of self-driving system ECUs,
the plurality of self-driving system ECUs include main ECUs and sub ECUs,
the power line and the communication line each have systems respectively corresponding to the main ECUs and the sub ECUs,
the communication line includes a main communication line of systems corresponding to the main ECUs and a sub communication line of systems corresponding to the sub ECUs,
the wiring junction box further comprises
a main communication junction unit configured to be connected to the main communication line and branch the main communication line, and
a sub communication junction unit configured to be connected to the sub communication line and branch the sub communication line, and
the main communication junction unit and the sub communication junction unit function as a layer 2 switch or a layer 3 switch.

2. The wiring junction box according to claim 1, wherein the power line includes a main power line of systems corresponding to the main ECUs and a sub power line of systems corresponding to the sub ECUs,
the communication line includes a main communication line of systems corresponding to the main ECUs and a sub communication line of systems corresponding to the sub ECUs,
the main power line branches according to the number of power output terminals for the main ECUs,
the main communication line branches according to the number of ECU-side communication ports for the main ECUs,
the sub power line branches according to the number of power output terminals for the sub ECUs, and
the sub communication line branches according to the number of ECU-side communication ports for the sub ECUs.

3. The wiring junction box according to claim 2, further comprising:
a sub power input terminal configured to be connected to a sub electrical storage device,
wherein the power line includes a connection line for connecting the power input terminal and the sub power input terminal, and
supply of electric power to the main ECUs and the sub ECUs is made redundant with the connection line.

4. The wiring junction box according to claim 3, wherein the connection line includes a separating unit configured to separate the power input terminal and the sub power input terminal, and
the separating unit separates the power input terminal and the sub power input terminal when there is an abnormality in the connection line.

5. The wiring junction box according to claim 1, wherein the communication device-side communication port includes a main communication port and a sub communication port,
the main communication line is connected to the main communication port, and
the sub communication line is connected to the sub communication port.

6. The wiring junction box according to claim 1, wherein the plurality of ECUs include operation system main ECUs and operation system sub ECUs, and
the operation system sub ECUs are connected to the power line and the communication line of the same systems as the sub ECUs.

7. The wiring junction box according to claim 3 or 4, arranged between the electrical storage device and the sub electrical storage device, and positioned at a center portion of the vehicle.

8. The wiring junction box according to claim 2, wherein the communication device-side communication port includes a main communication port and a sub communication port,
the main communication line is connected to the main communication port, and the sub communication line is connected to the sub communication port.

9. The wiring junction box according to claim 3, wherein the communication device-side communication port includes a main communication port and a sub communication port, the main communication line is connected to the main communication port, and the sub communication line is connected to the sub communication port.

10. The wiring junction box according to claim 2, wherein the plurality of ECUs include operation system main ECUs and operation system sub ECUs, and the operation system sub ECUs are connected to the power line and the communication line of the same systems as the sub ECUs.

11. The wiring junction box according to claim 3, wherein the plurality of ECUs include operation system main ECUs and operation system sub ECUs, and the operation system sub ECUs are connected to the power line and the communication line of the same systems as the sub ECUs.

12. The wiring junction box according to claim 5, wherein the plurality of ECUs include operation system main ECUs and operation system sub ECUs, and the operation system sub ECUs are connected to the power line and the communication line of the same systems as the sub ECUs.

* * * * *